(No Model.)
G. B. NESMITH.
SPLICE FOR DRIVE CHAINS.
No. 547,964. Patented Oct. 15, 1895.
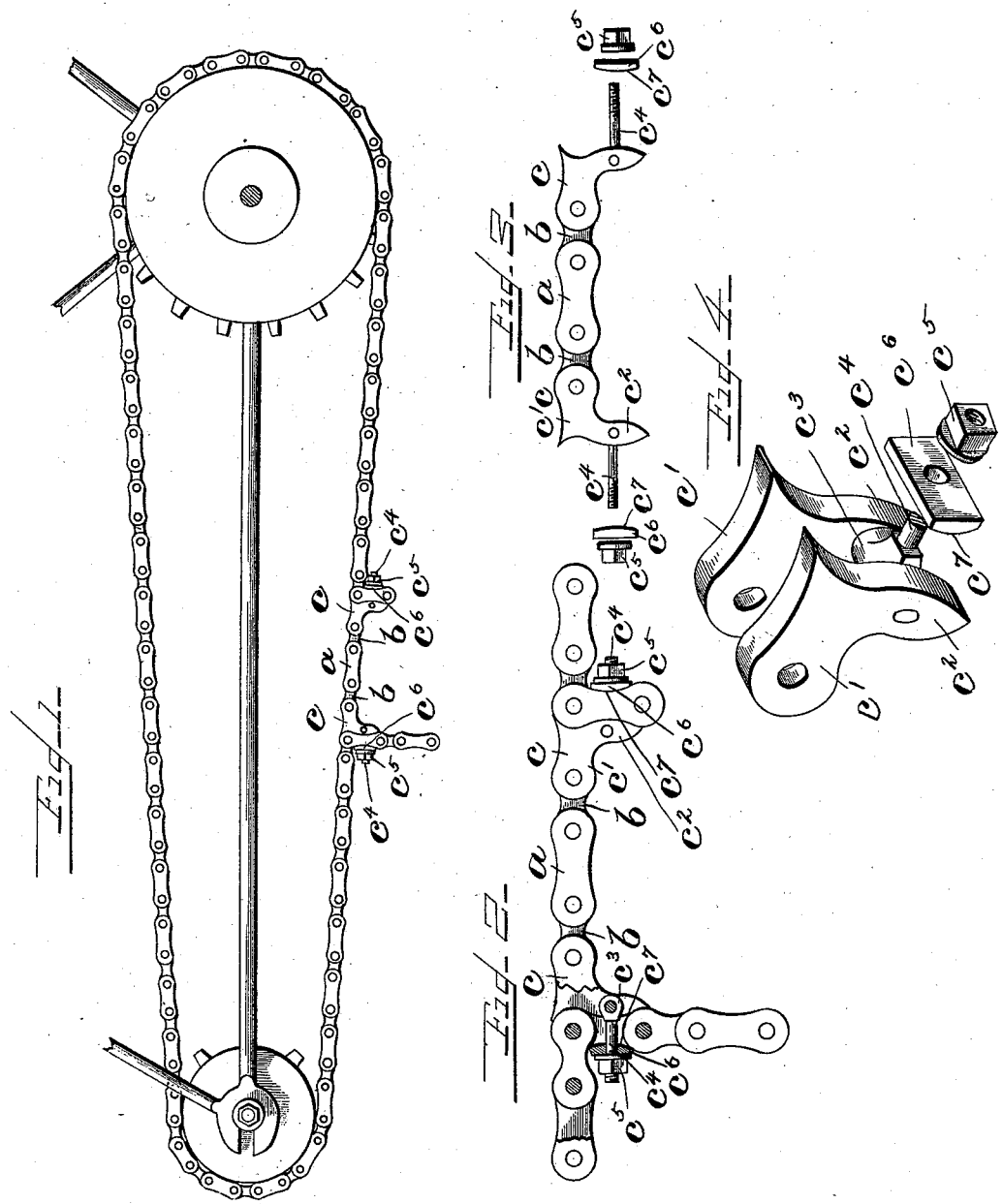

UNITED STATES PATENT OFFICE.

GEORGE B. NESMITH, OF WARREN, PENNSYLVANIA.

SPLICE FOR DRIVE-CHAINS.

SPECIFICATION forming part of Letters Patent No. 547,964, dated October 15, 1895.

Application filed March 12, 1895. Serial No. 541,471. (No model.)

*To all whom it may concern:*

Be it known that I, GEORGE B. NESMITH, a citizen of the United States, residing at Warren, in the county of Warren and State of Pennsylvania, have invented certain new and useful Improvements in Splices for Drive-Chains; and I do hereby declare the following to be a full, clear, and exact description of the invention, such as will enable others skilled in the art to which it appertains to make and use the same.

My invention consists in the novel features hereinafter fully described, reference being had to the accompanying drawings, which illustrate one form in which I have contemplated embodying my invention, and said invention is fully disclosed in the following description and claims.

Referring to the said drawings, Figure 1 represents a portion of a bicycle-frame, showing the sprocket-wheels and drive-chain with my improved splicing device inserted therein. Fig. 2 is an enlarged view of a portion of the chain with my improved splicing device inserted. Fig. 3 is a detail view of the splicing device, and Fig. 4 is an enlarged detail perspective view of one of the couplings at each end of the splice.

The object of my invention is to provide a splicing device for bicycle drive-chains, which can be carried on the person of the rider or in the saddle-bag and can be quickly placed in position in case the drive-chain breaks, so that the machine may be used as before.

The breaking of a bicycle-chain occurs by the breaking or losing of one of the rivets which connects two adjacent links. My improved splicing device is constructed so that it can be secured to a perfect link on each side of the break and will exactly take the place of the parts which are thrown out of use by the insertion of the splice.

Bicycle drive-chains are usually made up of a series of solid links connected by a series of open links; but my improved splice can be used as well where all the links are open. The splicing device consists of a certain number of ordinary drive-chain links, which, for convenience of reference, I term the "chain-section," having at the ends of the splice-coupling devices distinct from and independent of the links of the chain-section for securing the splice to the chain. In the drawings I have shown the splice as composed of one open link $a$ and two solid links $b$ $b$, (see Figs. 2 and 3,) and $c$ $c$ represent the coupling devices at the ends of the splice. Each of these coupling devices is constructed as shown in Fig. 3, and consists of an open link formed by two side plates $c'$ $c'$, having arms $c^2$ $c^2$ extending perpendicularly to the axes of said plates. The plates $c'$ $c'$ are connected to the last link of the splice by a pivot-pin, as usual, and the arms $c^2$ $c^2$ are united by a cross-bar $c^3$, which pivotally engages apertures in the said arms and is preferably riveted therein. The cross-bar $c^3$ is provided with a clamping device, consisting of a screw-threaded bolt or shank $c^4$ and nut $c^5$, and also with a block $c^6$, which has an aperture through which the shank $c^4$ passes, and a face $c^7$, usually curved, as shown, which is made to fit accurately the curved sides of one of the open chain-links.

To place a splice in position after a break has occurred in the chain, the nut $c^5$ and block $c^6$ are removed from each coupling-piece and the bolt or shank $c^3$ of one of said couplings is passed through the center aperture of one of the open links $a$, preferably the one next to the broken link. The edges of the coupling-piece are preferably so shaped as to fit accurately the chain-link, as shown in the drawings, and the block $c^6$ is then placed on the shank $c^3$ and made to engage the opposite face of the link, and the nut $c^5$ is then put on and screwed up tightly. The other coupling-piece will then be secured to the first open link on the other side of the break in the same manner. The main portions of the plates $c'$ $c'$ of the coupling-piece $c$ are of such length that when in operative position, as shown in Fig. 2, the said plates, with the addition of the width of the link to which they are coupled, will be just equal to the length of one link of the chain, and hence when the splice is in position the chain will be of the same length that it was before the break occurred. The unused links of the chain will be turned outwardly, as shown in Figs 1 and 2, so that they will not engage the sprocket-wheels, and the chain will run as well with the splice in place as it did before the break occurred. It will also be noted that the attaching bolts of the coupling devices are out of line with the wheel-engaging portions of the chain.

It will thus be seen that by using this splicing device a break in a drive-chain can be repaired in a very few moments and the rider can continue using the machine instead of being obliged to walk to the nearest repair-shop.

While I have shown and described my improved device as being used in connection with bicycle drive-chains, it is obvious that it could be used with other drive-chains if found desirable.

What I claim, and desire to secure by Letters Patent, is—

1. As an article of manufacture, a splicing device for drive chains comprising among its members, a chain section and coupling devices separate from the links of said chain section, secured to each end of the same, for rigidly engaging links of the chain to be spliced, substantially as described.

2. As an article of manufacture, a splicing device for drive chains, comprising among its members, a chain section and coupling devices, separate from the links of the chain section, secured to each end of the same, each of said couplings being provided with clamping devices, out of line with the chain section, for rigidly engaging a link of the chain to be spliced, substantially as described.

3. As an article of manufacture, a splicing device for drive chains, comprising among its members a chain section and coupling devices, separate from the links of said chain section, secured to each end of the same, each coupling having a part out of line with the chain section adapted to pass through a link of the chain to be spliced, and a clamping device for said link engaging said part, substantially as described.

4. A splicing device for drive chains comprising among its members a chain section and a coupling device at each end of said chain section provided with faces disposed perpendicularly to the chain for engaging one of the chain links, an attaching bolt and nut located out of line with the wheel engaging portions of the chain and a block on said bolt for engaging the said chain link on the side opposite said perpendicular face, substantially as described.

In testimony whereof I affix my signature in presence of two witnesses.

GEORGE B. NESMITH.

Witnesses:
W. J. RICHARDS,
C. B. AYERS.